(12) United States Patent
Huff

(10) Patent No.: US 6,973,996 B2
(45) Date of Patent: Dec. 13, 2005

(54) LADDER MOUNTING APPARATUS AND METHOD OF USE

(76) Inventor: Franklin Joseph Huff, 802 Cougar Ranch Rd., Beaumont, CA (US) 92223

( * ) Notice: Subject to any disclaimer, the term of this patent is extended or adjusted under 35 U.S.C. 154(b) by 54 days.

(21) Appl. No.: 10/732,790

(22) Filed: Dec. 11, 2003

(65) Prior Publication Data

US 2005/0128442 A1 Jun. 16, 2005

(51) Int. Cl.[7] ............................................... E06C 5/00
(52) U.S. Cl. ..................................... 182/127; 224/324
(58) Field of Search .................... 182/127; 224/42.11, 224/324, 309, 315

(56) References Cited

U.S. PATENT DOCUMENTS

| | | | |
|---|---|---|---|
| 2,080,527 A | 5/1937 | Bixel | 224/29 |
| 2,237,853 A * | 4/1941 | Troche | 182/127 |
| 3,251,519 A | 5/1966 | Jones | 224/42.1 |
| 3,722,766 A | 3/1973 | Barrineau et al. | 224/42.1 |
| 4,170,331 A | 10/1979 | Faulstich | 224/324 |
| 4,262,834 A | 4/1981 | Nutt | 224/324 |
| 4,618,083 A * | 10/1986 | Weger, Jr. | 224/324 |
| 4,813,585 A | 3/1989 | Nutt | 224/324 |
| 4,827,742 A * | 5/1989 | McDonald | 70/19 |
| 4,887,750 A | 12/1989 | Dainty | 224/42.11 |
| 6,524,042 B2 | 2/2003 | Chasen | 410/120 |
| 6,688,428 B2 * | 2/2004 | Carroll, Jr. | 182/127 |
| 2003/0188923 A1 * | 10/2003 | Moss | 182/23 |

FOREIGN PATENT DOCUMENTS

FR 2690480 A1 * 10/1993 ............. E06C 5/16

* cited by examiner

Primary Examiner—Alvin Chin-Shue
(74) Attorney, Agent, or Firm—Gene Scott & Patent Law and Venture Group

(57) ABSTRACT

A ladder storage rack uses a pair of spaced apart channels positioned with upper portions arranged in mutual parallel and with lower portions in mutual divergence so as to accept a ladder with upper leg portions in parallel positions and with lower leg portions in a divergent relationship. Plural feet extend from the channels and terminate with mounting plates enabling securement to a mounting deck; as, for instance, of a fire truck. A ladder restraining bar is engaged between the channels at a one end and near the other end of the channels, a means for clamping is positioned for engaging a ladder supported by the apparatus.

10 Claims, 3 Drawing Sheets

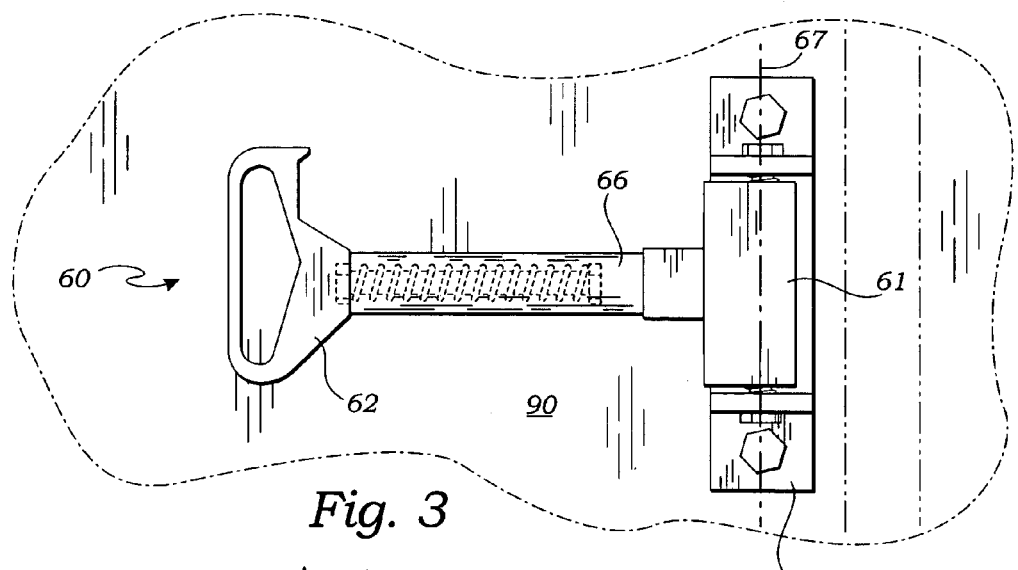
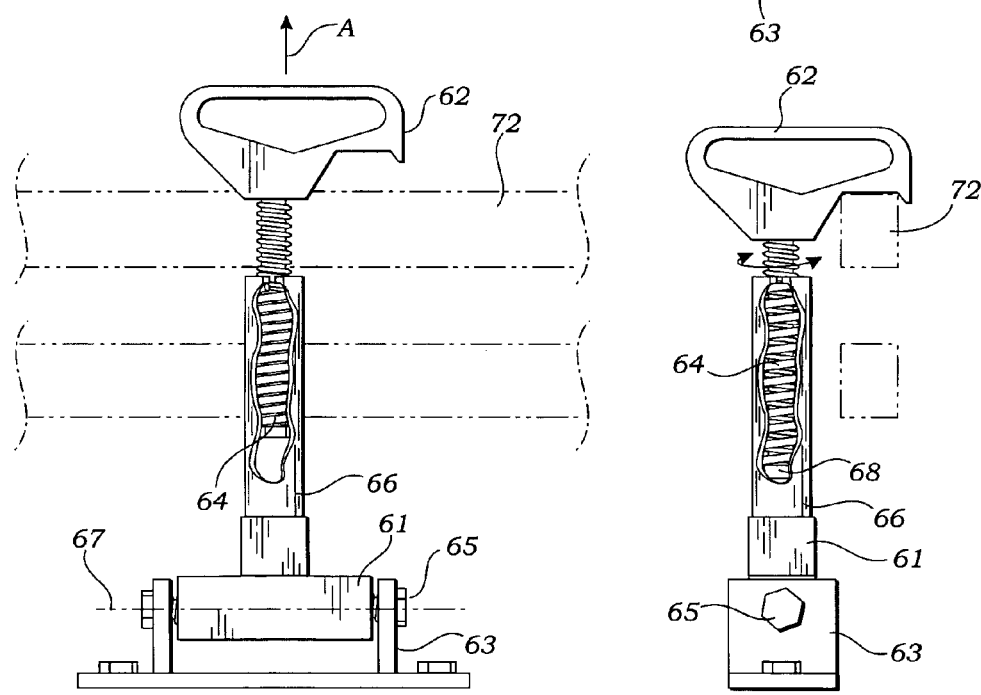
Fig. 3
Fig. 4
Fig. 5

LADDER MOUNTING APPARATUS AND METHOD OF USE

BACKGROUND OF THE INVENTION

INCORPORATION BY REFERENCE

Applicant(s) hereby incorporate herein by reference, any and all U.S. patents, U.S. patent applications, and other documents and printed matter cited or referred to in this application.

1. Field of the Invention

This invention relates generally to racks for storing ladders and more particularly to a ladder storing rack for use on a truck or other mobile carrier and specifically a fire truck; the invention also relates to the use of such an apparatus especially with a fire truck.

2. Description of Related Art

The following art defines the present state of this field:

Bixel, U.S. Pat. No. 2,080,527 describes a supporting bracket having a surface upon which an object to be supported may rest, and overthrow lever having a slot and pin connection with said bracket, a clamp member pivoted to the overthrow lever intermediate the ends of said lever and adapted to clamp the object upon the support, and tension means so arranged as to exert tension upon the pin connection upon which the lever is pivoted in such direction as to hold the clamp member in clamping position.

Jones, U.S. Pat. No. 3,251,519 describes a roof rack for a truck comprising a rectangular frame fixedly secured to the outside of the roof of a truck, said rack including a transversely extending end piece, a clamp comprising an arm, means pivotally securing said arm to said end piece, a link pivotally mounted on said arm, a rest engageable with an object on the roof of a truck, means mounting the rest on said link, a handle pivotally mounted on said arm, and a strap pivotally attached to both the handle and the link.

Barrineau et al., U.S. Pat. No. 3,722,766 describes a device capable of handling 24 ft. or 28 ft. extension ladders on top of a telephone truck. The present ladder rack is easily assembled and installed without special modification of the vehicle by attachment of a pair of bow supports secured to the vehicle rain gutter on each side. Longitudinal ladder support members are attached to the bow supports and a movable ladder rung finger catch arrangement Is operated by a spring steel handle which latches in place to move and clamp the ladder tightly in place on the rack. Ladder abutment feet have curved faces which are reversed from one another to assist in removing the ladder from the truck and from placing it thereon while standing alongside: To assist in positioning the ladder the spring steel handle 19 operated to push the ladder rearward against the fixed feet by means of the rung engagement fingers and then the handle is relatively shiftable to be spring biased into a notch, or without the ladder the fingers are retracted against the vehicle top spring tensioned by the handle.

Faulstich, U.S. Pat. No. 4,170,331 describes a ladder rack mounted on top of a vehicle including upstanding guide stops at one end only of the rack on each side frame member for holding one end of a ladder while the other end is being pivoted onto the rack. An upstanding stop on an end cross-frame member engages a rung of the ladder adjacent one end and a coil spring mounted on a cross-frame member at the other end of the rack includes a perpendicular finger end portion adapted to be pivoted from a horizontal position to a vertical position in engagement with an adjacent rung of the ladder to apply pressure downward and towards the stop on the other cross-frame member.

Nutt, U.S. Pat. No. 4,262,834 describes a vehicle roof rack comprising a rack frame and a releasable clamping device for releasably clamping a ladder thereto. The clamping device includes a clamp arm which is pivoted to a rigid support and operated by a crank mechanism by moving across a dead-center position to clamp the ladder in place. Clamping members are resiliently supported on the clamp arm to engage the ladder and exert a clamping pressure on it.

Nutt, U.S. Pat. No. 4,813,585 describes a vehicle ladder rack for storage of a ladder upon the roof of a vehicle. The rack comprises a horizontal frame, at one end of which a hooked clamping bar engages a ladder rung. The clamping bar is manually operable, pivoting about a horizontal axis from a lower release position through an upper intermediate position and sliding downwardly to a clamped position. Manually operable means comprises several levers and rotating shafts providing a resilient clamping of the ladder rung, and latching in the clamped position.

Dainty, U.S. Pat. No. 4,887,750 describes a rack arrangement for supporting a load, for example above the roof of a vehicle body, comprising a pair of substantially parallel elongate guide members 3 each having a lower upwardly extending portion 3a and an upper load supporting portion 3b. A load carrier member 4 is rockably connected to the guide members and is manually slidable from a lowered position upwardly along the lower guide member portions 3a onto the supporting portions 3b to a load storage position. Means is provided for releasably retaining the carrier member in the load storage position, for example a cup-like recess 17 which locates the base of a handle 12 for the carrier member.

Chasen, U.S. Pat. No. 6,524,042 describes a compact apparatus for securing equipment to a surface of a vehicle including an elongate shaft slidably extending through a support member attached to the vehicle. An engagement member is formed on one end of the shaft for engaging and retaining equipment on the exterior of the vehicle. A spring-loaded latching assembly is provided to retain the engagement member in a securing relationship with the equipment. The latching assembly illustratively includes an arrangement for transferring a biasing force from a spring to the shaft to bias the shaft in a condition wherein the engagement member secures the equipment in place. The latching assembly includes control lever and a cam arrangement that allows easy manual operation of the latching assembly.

Our prior art search with abstracts described above teaches: ladder racks, a roof rack for a truck, a ladder holder, a compact equipment securing apparatus, and a rack arrangement, but does not teach the rack mounting apparatus of the present invention as to its construction and clamping method. The present invention fulfills these needs and provides further related advantages as described in the following summary.

SUMMARY OF THE INVENTION

The present invention teaches certain benefits in construction and use which give rise to the objectives described below.

The present invention is a ladder storage rack which uses a pair of spaced apart L-channels positioned with upper portions arranged in mutual parallel and with lower portions in mutual divergence so as to accept a ladder with upper leg portions in parallel positions and with lower leg portions in a divergent relationship. Plural feet extend from the channels and terminate with mounting plates enabling securement of the ladder at an elevated position on a mounting deck; as, for instance, of a fire truck. A ladder restraining bar is engaged between the channels at one end and near the other end of the channels, a means for clamping is positioned for engaging the ladder which is mounted on and supported by the apparatus. The clamping means is positioned to hold the ladder with the parallel portions resting on the parallel portions of the L-channels and with the divergent portions resting on the divergent portions of the L-channels. With the clamping means fastened to the lowest step of the ladder, the ladder is in contact with stop bars protruding from the L-channels so that the ladder is unable to move within the rack.

A primary objective of the present invention is to provide an apparatus and method of use of such apparatus that yields advantages not taught by the prior art.

Another objective is to provide such an invention capable of supporting a ladder securely yet enabling very quick dismount of the ladder when needed in an emergency.

A further objective is to provide such an invention capable of securing a ladder positively so that it can withstand inertial forces from the movement of its vehicle mount.

A still further objective is to provide such an invention capable of securing a ladder with divergent legs.

A yet further objective is to provide such an invention capable of being constructed and mounted on a truck at very low cost.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 3 is a plan view of the clamping device shown in the retracted position;

FIG. 4 is a front elevational view of the clamping device shown in its elevated (employed) position and with its hooked handle shown in a deployed position; and FIG. 5 is a side elevational view of the clamping device shown in its employed position with a hooked handle thereof shown rotated into a ladder engaging (employed) attitude.

DETAILED DESCRIPTION OF THE INVENTION

Figure 1:
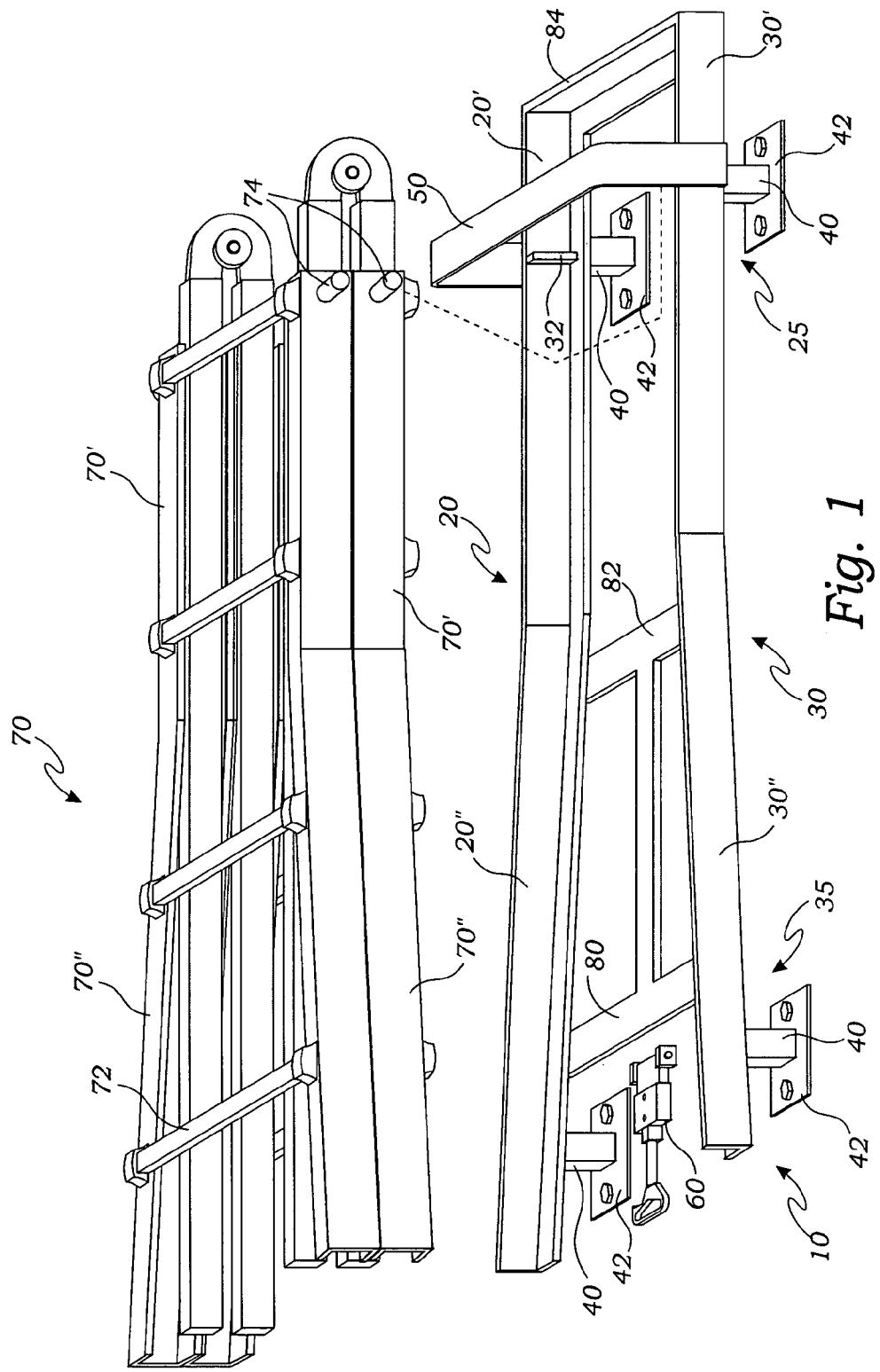
FIG. 1 is an exploded perspective view of the invention, a ladder rack with clamping device, and in combination therewith, a ladder, the clamping device shown in a retracted position.

The above described drawing figures illustrate the invention in at least one of its preferred embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

The present invention includes a ladder storage rack, the combination of the rack and a ladder, both, and a method of storing the ladder using the ladder storage rack.

A ladder storage rack apparatus 10 comprises a pair of spaced apart channels 20 and 30 positioned with upper portions 20' and 30' respectively arranged in mutual parallel, and lower portions 20" and 30" respectively in mutual divergent attitudes. The channels 20, 30 are preferably L-shaped channels, as shown, of steel or similar high strength, rigid and durable construction. Plural feet 40 extend from the channels 20, 30, the feet terminating with a means for mounting 42 of the apparatus, in this embodiment, mounting plates, as clearly shown in FIGS. 1 and 2. A ladder restraining bar 50 is engaged between the channels 20, 30 at a distal end 25 thereof, and at a proximal end 35 of the channels 20, 30, a means for clamping 60 is positioned for engaging a ladder 70 which is engaged by and supported by the apparatus 10 as shown in FIG. 2. It should be noted that the channels 20, 30, preferably L-shaped bars, provide two orthogonal legs. When the invention is mounted on the deck of a truck, for instance, one of the legs is oriented in the horizontal and the other of the legs is oriented in the vertical. When the ladder 70 is rested in the channels 20, 30, the horizontal legs support the weight of the ladder 70, and the vertical legs restrain the ladder from moving laterally. In this manner, the combination rack and ladder provide a superior manner of supporting this important piece of equipment in a moving vehicle.

Preferably, the upper portions 20', 30' of the channels 20, 30 provide inwardly directed stop bars 32 placed to stop the ladder 70 at an appropriate position within the rack 10. The ladder 70 provides corresponding laterally protruding rods 74 which are positioned for engagement with the stop bars 32 so that the ladder 70 is wedged between the stop bars 32 and the clamping means 60. This wedging action is important since the ladder 70 tends to move in reaction to accelerating forces applied by movement of a vehicle on which the rack 10 is mounted. The stop bars 32 prevent the top of ladder 70 from hitting cross strut 84 when the ladder 70 is inserted into the rack 10. This is important since certain types of ladders 70 are somewhat fragile when folded so that the top exposes operating mechanisms.

Figure 2:
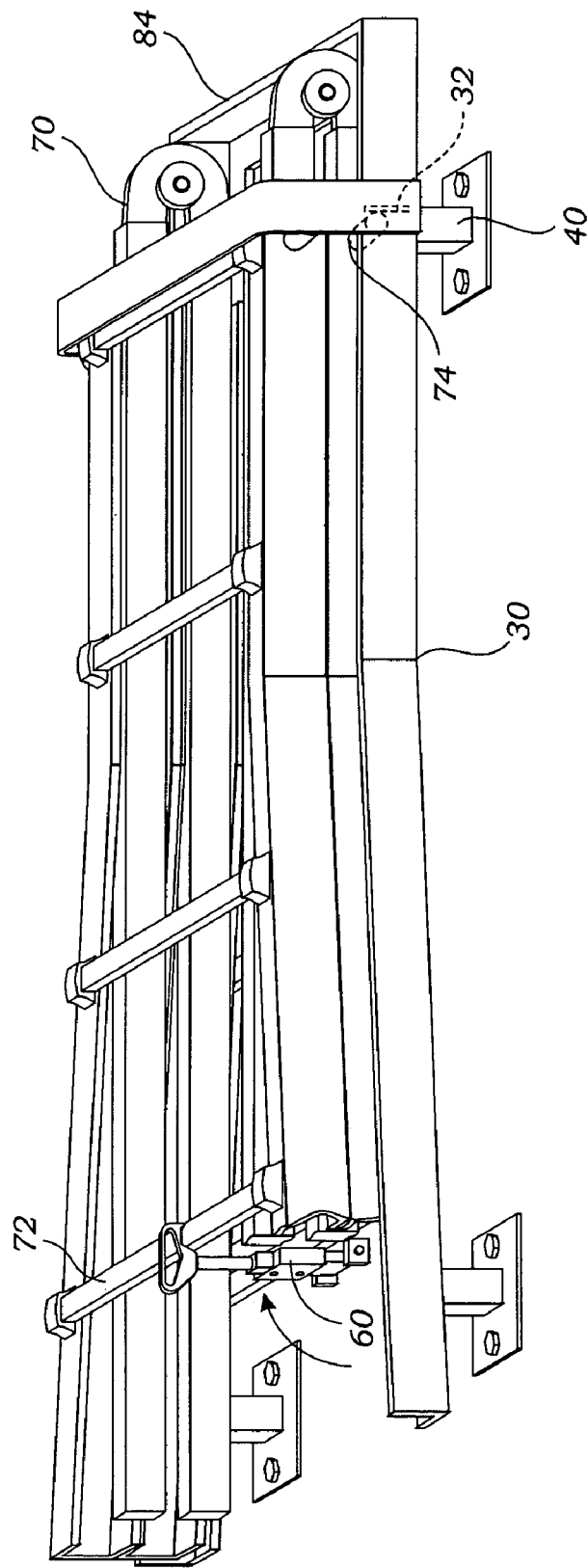
FIG. 2 is a perspective view thereof, showing the ladder mounted in the ladder rack with the clamping device shown in the employed position.

Preferably, the rack 10 provides at least two cross struts 80, 82, 84 joining the channels 20, 30 into an integral assembly, as best seen in FIG. 1. The struts 80, 82 84 are preferably steel members or the equivalent for strength, rigidity and durability. Such cross bracing is accomplished using welding or other well known assembly method for securely engaging these parts.

Preferably, one 84 of the at least two cross struts 80, 82, 84 is positioned at the distal end 25 of the apparatus so as to secure the distal ends of the channels 20, 30, and the one 84 strut is preferably an L-channel similar to the channels 20, 30.

Preferably, the clamping means 60 provides a spring-loaded hooked handle 62, the clamping means thereby being enabled for longitudinal spring-biased extension, as is shown in FIGS. 4 and 5. Coil spring 64 is mounted in tube 66, whereby integral pull rod 68, extensive from, and integral with, handle 62, provides a restraining force when handle 62 is raised as illustrated by arrow "A" as shown by arrow "A" in FIG. 4. Also, clamping means 60 is mounted in base block 61 rotatable in support yolk 63 between a position below the channels 20, 30, as shown in FIGS. 1 and 3, and a position orthogonal to the channels 20, 30, as shown in FIGS. 2, 4 and 5. Hinge rod 65 provides rotational support of base block 61 in support yolk 63 for rotation about its longitudinal axis 67.

Preferably, the feet 40 and the clamping means 60 are both engaged with a supporting plate 90, which may be the upper deck of a fire truck, as an example.

The present invention further provides a method of use of the combination rack apparatus 10 and the ladder 70. This method includes positioning the pair of channels 20, 30 in spaced apart positions with upper portions 20', 30' thereof arranged in mutual parallel and lower portions 20", 30" thereof in mutual divergence; extending plural feet 40 from the channels 20, 30, and terminating the feet 40 with the means for mounting, i.e., the plates 42. The method further includes engaging the ladder restraining bar 50 between the channels at the distal end 25 and engaging the means for clamping 60 at the proximal end 35 of the channels 20, 30 in a position for engaging a step 72 of the ladder 70 so as to support and capture the ladder 70 in the rack 10.

The method further comprises the steps of sliding the ladder 70 into the channels 20, 30 with upper parallel portions 70' of the ladder cradled in the upper portions 20' 30' of the channels 20, 30, and lower divergent portions 70", of the ladder 70 cradled in the lower portions 20", 30" of the channels 20, 30, and then engaging the ladder 70 with the clamping means 60 so as to hold the ladder 70 in the channels 20, 30 securely.

The method further comprises the step of enabling the clamping means 60 with the spring-loaded hooked handle 62, and engaging the hooked handle 62 with the ladder 70, as shown in FIG. 2.

To accomplish this, the claiming means 60 is rotated from its inactive position below the channels 20, 30, as shown in FIG. 1, to its active position orthogonal to the channels 20, 30, and rotating the hooked handle 62 about its longitudinal axis 67 in order to engaging the hooked handle 62 with the step 72 of the ladder 70.

Preferably, the method further comprises the step of engaging the feet 40 and the clamping means 60 with the common supporting plate 90, as described above.

The words used in this specification to describe the invention and its various embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of this described invention and its various embodiments are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments below or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A ladder storage rack and a ladder having side rails and rungs comprising: in the storage rack, a pair of spaced apart channels, catch of the channels providing inwardly directed stop bars; plural feet extending from the channels for supporting the storage rack; a means for clamping, the ladder to a storage rack, the ladder providing laterally protruding rods on the side-rails engaging with the stop bars, the clamping means engaging the ladder such that the laddeer is wedged between the stop bars and the clamping means.

2. The apparatus of claim 1 further comprising at least two cross struts joining the channels into an integral assembly.

3. The apparatus of claim 2 wherein one of the at least two cross struts is positioned at a distal end of the apparatus.

4. The apparatus of claim 3 wherein the one of the cross struts is an L-channel.

5. The apparatus of claim 1 wherein the pair of spaced apart channels are L-channels.

6. The apparatus of claim 1 wherein the clamping means provides a spring-loaded hooked handle, the clamping means thereby enabled for longitudinal spring-biased extension.

7. The apparatus of claim 1 wherein the clamping means is rotatable between a position below the channels, and a position orthogonal to the channels.

8. The apparatus of claim 7 wherein the handle is rotatable about a longitudinal axis of the clamping means.

9. The apparatus of claim 1 wherein the feet and the clamping means are both engaged with a supporting plate.

10. A ladder storing method comprising the steps of: positioning a pair of channels in spaced apart positions; extending plural feet from the channels, and terminating the feet with a means for mounting; engaging a means for clamping at a proximal end of the channels in a position for engaging a ladder having side rails and rungs supported by the apparatus; placing the ladder onto the channels with protruding rods extending laterally from the side rails thereof engaging stop bars of the channels; and wedging the ladder between the stop bars and the clamping means.

* * * * *